United States Patent [19]

Mayers

[11] Patent Number: 4,605,169

[45] Date of Patent: Aug. 12, 1986

[54] EXHAUST NOZZLE CONSTRUCTION

[75] Inventor: John L. Mayers, Lake Park, Fla.

[73] Assignee: United Technologies Corporation, Hartford, Conn.

[21] Appl. No.: 565,488

[22] Filed: Dec. 27, 1983

[51] Int. Cl.⁴ .............................................. F02K 1/42
[52] U.S. Cl. ............................ 239/265.29; 60/229; 60/230; 239/265.41; 244/12.5; 244/23 D; 244/110 B
[58] Field of Search .............. 239/265.27, 265.29, 239/265.39, 265.41, 436, 447, 449, 504, 505, 518, 587; 60/226.1, 226.2, 226.3, 228-230; 244/12.5, 23 D, 110 B

[56] References Cited

U.S. PATENT DOCUMENTS

| | | |
|---|---|---|
| 2,849,861 | 9/1958 | Gardiner et al. ............... 239/265.29 |
| 2,964,905 | 12/1960 | Hewson et al. ............... 239/265.29 |
| 3,280,560 | 10/1966 | Marchant et al. ................. 60/229 |
| 3,837,411 | 9/1974 | Nash et al. ..................... 244/110 B |
| 3,943,707 | 3/1976 | Nash .............................. 239/265.29 |
| 3,973,731 | 8/1976 | Thayer .......................... 239/265.29 |
| 4,005,823 | 2/1977 | Thayer .......................... 239/265.37 |

Primary Examiner—Andres Kashnikow
Assistant Examiner—Michael J. Forman
Attorney, Agent, or Firm—Stephen E. Revis

[57] ABSTRACT

An engine nozzle construction having a flap nozzle at the end of an engine exhaust duct, said flap nozzle variably controlling exhaust flow providing a primary flow path, said flap nozzle being movable to a position to direct the exhaust flow from said exhaust duct into a peripheral chamber, said chamber having exit openings around it providing for a secondary flow path for the exhaust flow.

12 Claims, 7 Drawing Figures

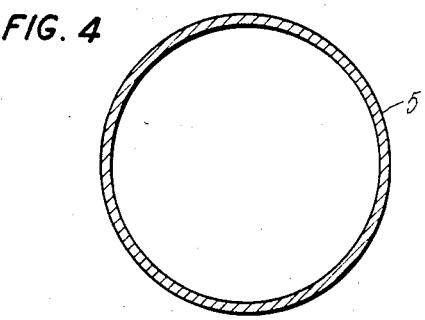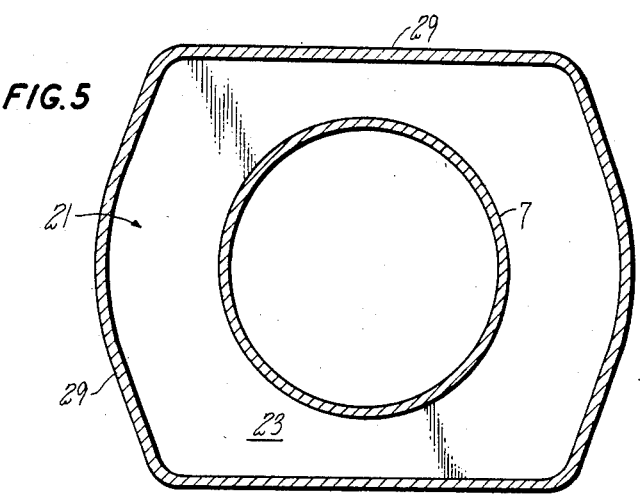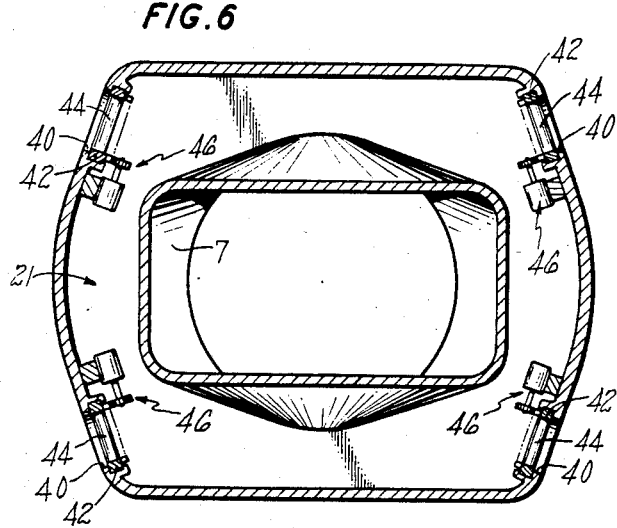

EXHAUST NOZZLE CONSTRUCTION

TECHNICAL FIELD

This invention relates to an exhaust nozzle construction for a turbine engine which provides a primary exhaust flow path and a secondary exhaust flow path for providing forward thrust, reverse thrust and attitude control of an aircraft.

BACKGROUND ART

Many engine nozzles provide for two flow paths, (1) a primary exhaust flow path which permits a forward thrust and (2) by a blocking of the primary exhaust flow path, a secondary exhaust flow path which permits thrust reversal, with some designs providing for a partial forward thrust and partial reverse thrust at the same time, such as shown in U.S. Pat. No. 4,183,478. Further, some aircraft have had attitude control nozzles, such as shown in U.S. Pat. No. 4,102,499. Specific two-dimensional nozzle constructions similar to the basic nozzle construction shown in this application are set forth in U.S. Pats. Nos. 3,973,731, 4,005,823 and 4,052,007.

DISCLOSURE OF INVENTION

One object of the present invention is to provide an improved nozzle construction including a peripheral chamber around an engine exhaust duct into which exhaust flow can be directed by flaps in the primary exhaust flow path to form a secondary exhaust flow path, exhaust flow directed into said peripheral chamber leaving said peripheral chamber by a plurality of circular openings positioned around its outer surface, each opening having a rotatable ring therein with fixed vanes for directing the flow at an angle to the axis of the ring.

Another object of the present invention is to provide an actuating device for individually rotating each rotatable ring to select the direction in which the secondary exhaust flow exits from each ring; thrust can be vectored (up, down, left, right, fore, aft) to help control the aircraft attitude, especially during approach and landing.

A further object of the present invention is to provide a flap nozzle at the end of an engine exhaust duct, said flap nozzle providing for controlling the exiting of the exhaust flow, in a primary flow path, between a minimum and maximum area, said flap nozzle being movable to a position to direct exhaust flow from said engine exhaust duct into a peripheral chamber, said peripheral chamber having exit openings around its outer surface; said flow from said engine exhaust duct through said peripheral chamber and said exit openings providing for a secondary exhaust flow path. The primary exhaust flow path having a variable exit area while said secondary flow path has a constant exit area.

Another object of the present invention is to provide a plurality of circular openings around the outer surface of a peripheral chamber which is in turn positioned around an engine exhaust duct for receiving exhaust flow therefrom, said circular openings each having a rotatable ring therein with fixed vanes for directing flow passing therethrough at an angle to the axis of the ring, said rotatable rings being movable between positions where they provide a range of forward thrust from a maximum thrust to zero while the aircraft power plant is at maximum R.P.M. Low actuator loads are possible to rotate said rotatable rings since no unbalanced gas loads have to be overcome as in flap type nozzles.

BRIEF DESCRIPTION OF THE DRAWINGS

FIG. 4 is a view taken along the line 4—4 of FIG. 1 showing the circular engine exhaust duct;

FIG. 5 is a view taken along the line 5—5 of FIG. 1 showing the forward closed end of the peripheral chamber around the circular forward part of the transition section;

FIG. 6 is a view taken along the line 6—6 of FIG. 1 showing circular openings around the peripheral chamber with rotatable rings having fixed vanes and the rectangular mid-portion of the transition section.

BEST MODE FOR CARRYING OUT THE INVENTION

Figure 1:
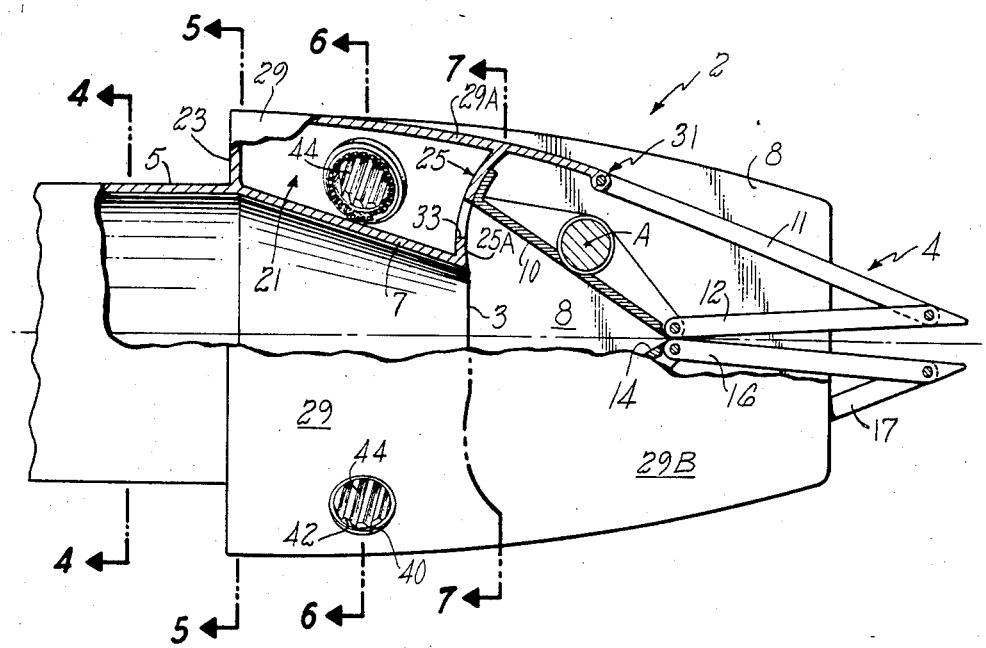
FIG. 1 is a schematic view, partially in section, of the exhaust nozzle construction on an engine exhaust duct; the nozzle flaps are shown in a closed position for directing all exhaust flow into a peripheral chamber.

The exhaust duct 5 of a turbojet engine is shown having a nozzle construction 2 connected thereto. This nozzle construction 2 includes a two-dimensional nozzle 4 at the end of a transition section 7 which takes the flow in the exhaust duct 5 from a circular cross-section to a rear end 3 having a rectangular cross-section while maintainng the flow area substantially the same.

Figure 2:
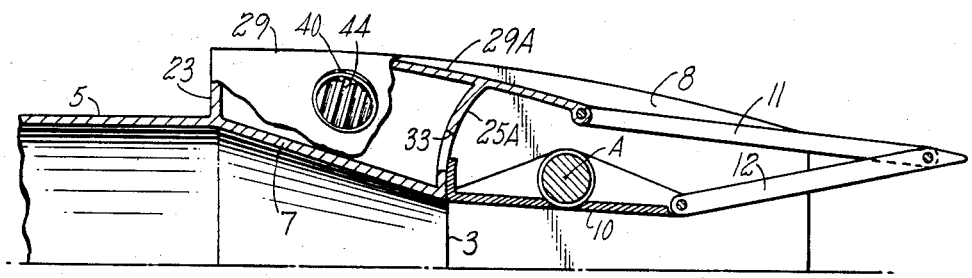
FIG. 2 is a schematic view showing the nozzle flaps in a position of maximum throat area.
Figure 3:
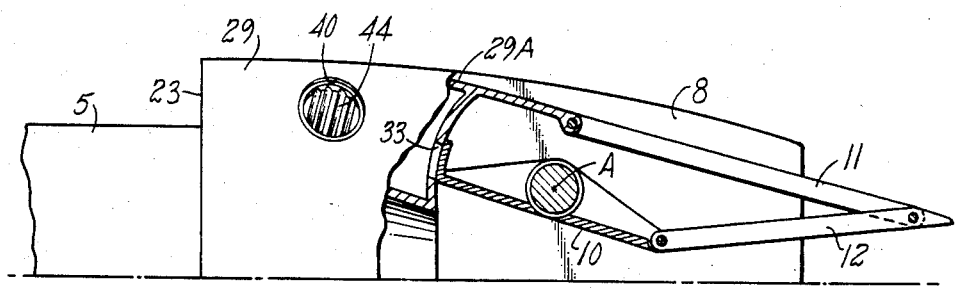
FIG. 3 is a schematic view showing the nozzle flaps in a position of minimum throat area.
Figure 7:
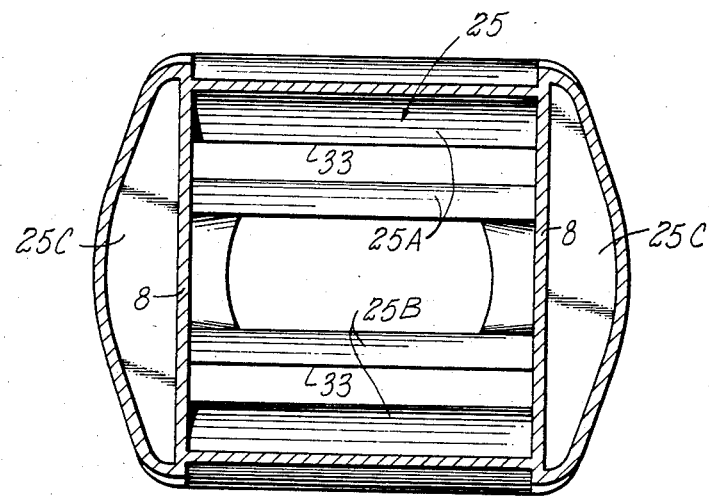
FIG. 7 is a view taken along the line 7—7 of FIG. 1 showing the rectangular rear exit end of the transition section and the rear upper and lower curved wall of the peripheral chamber along with sidewalls for the nozzle flaps, each curved wall having an opening into said peripheral chamber.

The two-dimensional nozzle 4 comprises two side plates 8, one extending rearwardly from each side of the rectangular cross-section of the rear end 3 of the transition section 7. A flap system is positioned at the top and the bottom of the two-dimensional nozzle 4 with each system having three cooperating flaps 10, 12 and 11, and 14, 16 and 17, respectively. Each flap 10 and 14 is pivotally mounted between the side plate 8 on an axis. Axis A for flap 10 is shown in FIGS. 1, 2 and 3, with the axis for flap 14 not being shown. The two-dimensional nozzle 4 provides a primary exhaust flow path.

A peripheral chamber 21 is located around the transition section 7 of the exhaust duct 5. This peripheral chamber 21 has a front wall 23 extending radially outwardly from the forward edge of the transition section 7 of the exhaust duct 5. The rear wall 25 of the peripheral chamber 21 has an upper curved wall 25A and a lower curved wall 25B which cooperate with the arc made by the forward edge of the cooperating flaps 10 and 14, respectively. Each of these upper and lower curved walls 25A and 25B extends between the forward edges of the side plates 8. The remainder of the rear wall 25 extends outwardly from each side plate 8 as wall sections 25C to engage a fairing wall 29B, to be hereinafter described.

An outer peripheral wall 29 which extends around the peripheral chamber 21 is fixed at its forward end to the outer edge of front wall 23. As the peripheral wall 29 extends rearwardly, it curves inwardly, slightly more at its top and bottom at 29A to meet the outer edges, respectively, of the upper curved wall 25A and lower curved wall 25B. Each of these peripheral wall portions 29A extends a short distance further downstream between the side plates 8 to form a rearward hinge portion 31 for a forward hinge portion of flaps 11 and 17, respectively. As the peripheral wall curves inwardly at each side, it forms an outer fairing wall 29B with each side plate 8.

Means for actuating the flaps of the two-dimensional nozzle 4 are shown in U.S. Pat. No. 3,973,731. One location for the actuating means could be within the fairing wall 29B and side plate 8.

Each upper and lower curved wall 25A and 25B has a rectangular opening 33 therein to permit exhaust flow to be directed into the peripheral chamber 21 when the flap system is positioned to block the flow and cause a reverse flow (see FIG. 1). Peripheral chamber 21 is provided with a plurality of openings 40 around the peripheral wall 29 thereof in which a ring 42 is mounted for rotation, each ring having a plurality of fixed curved flow directing vanes 44. Exhaust flow directed into the peripheral chamber 21 exits out of the rings 42 through the fixed curve vanes 44 providing a secondary exhaust flow path. Each ring 42 is individually rotatable through 360° by an actuating device 46. The fixed curved vanes 44 can be set to direct flow therefrom at any desired angle to the face of the ring 42. In one designed ring 42 with vanes 44, the vanes directed flow from the plane of the ring at an angle of approximately 30°.

In the embodiment shown, the peripheral wall 29 is curved outwardly at the sides with an opening 40 being positioned at the upper and lower corner of each side wall facing outwardly at an angle to provide for thrust vectoring (up, down, left, right, fore, aft) by use of all of the rings 42 fixed flow directing vanes 44 in the openings 40. Other numbers and positioning of openings can be used as desired.

The forward end of each flap 10 and 14 comprises an outwardly extending curved flange portion, only the curved flange portion 10A of flap 10 is shown, for providing a sealing action with the rearward surface of the upper curved wall 25A and lower curved wall 25B of the peripheral chamber 21. As stated hereinbefore, the rear wall 25 has an upper curved wall 25A and a lower curved wall 25B. It is the outwardly extending curved flange portion of the flaps which blocks flow through rectangular openings 33 into the internal area between the flaps 10, 12 and 11 and 14, 16 and 17, respectively, as the forward edge of the flaps 10 and 14 move across the rectangular opening 33 from one edge to the other.

The total area of both rectangular openings 33 is made slightly larger than $A_{Jmin}$, the minimum throat area of the two-dimensional nozzle 4, to keep the pressure at the rear end 3 of the transition section 7 approximately the same as the upper and lower flap systems move from the minimum throat area position in FIG. 3 to the closed position in FIG. 1, when the exhaust flow is redirected into the peripheral chamber 21; the total area of the opening area through the rings 42 and fixed vanes 44 is also made this slightly larger size of the openings 33.

It can be seen that all of the rings 42 can be positioned to direct their flow directing vanes 44 rearwardly to obtain a maximum forward thrust while the turbine engine is at maximum R.P.M. and the forward thrust can be reduced from a maximum to zero by rotating the top two rings 42 to a position where the flow is directed upwardly and the bottom two rings 42 to a position where the flow is directed downwardly with the turbine engine maintained at maximum R.P.M. From this position, if a landing has been made and thrust reversal desired, the rings 42 can be rotated further in the same direction with the top two rings moving to a position where the flow is directed forwardly and the bottom two rings moving to a position where the flow is directed forwardly.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In combination with an aircraft engine exhaust duct, a peripheral housing positioned around said exhaust duct forming a peripheral chamber, nozzle means being movable to control exhaust flow through said exhaust duct to provide a primary flow path, inlet openings located through said peripheral housing into said peripheral chamber for receiving exhaust flow from said exhaust duct, said nozzle means being movable to direct exhaust flow from said exhaust duct into said peripheral chamber through said inlet openings, outlet openings positioned in said peripheral housing to direct exhaust flow therefrom to provide a secondary flow path.

2. A combination as set forth in claim 1 wherein each of said outlet openings has a ring mounted therein for rotation, each ring having vanes for flow directing, said rings being movable to provide a variable forward thrust and a rearward thrust.

3. A combination as set forth in claim 2 wherein said nozzle means provides a variable exit area for controlling thrust, and said outlet openings provide a constant exit area for controlling thrust.

4. A combination as set forth in claim 1 wherein said peripheral housing has a rear wall, said rear wall containing said inlet openings, said nozzle means having seal means which cooperates with said rear wall to cover and uncover said inlet openings, control means for moving said nozzle means to cover and uncover said inlet openings.

5. A combination as set forth in claim 4 wherein said nozzle means has upper and lower flaps with forward edges which cooperate with the upper and lower curved sections, said seal means blocking flow out of the peripheral chamber through the inlet openings outwardly around the forward edges of the flaps as the forward edges move across the inlet openings.

6. A combination as set forth in claim 4 wherein the total area of both inlet openings is made slightly larger than the minimum area of said nozzle means.

7. A combination as set forth in claim 1 wherein the forward part of said exhaust duct is circular and said exhaust duct has an end transition section which contours a circular duct to a rectangular duct at its end, said rectangular end having an upper edge and a lower edge, said nozzle means being a two-dimensional flap nozzle means connected to the rectangular end of the transition section, said peripheral housing having a rear wall, said rear wall including an upper curved section extending upwardly from the upper edge of said rectangular end and a lower curved section extending downwardly from the lower edge of said rectangular end, said inlet openings being located in said upper and lower curved sections, said two-dimensional flap nozzle means having upper and lower flaps with forward edges which cooperate with the upper and lower curved sections, respectively, of said rear wall.

8. A combination as set forth in claim 7 wherein each of said forward edges of said upper and lower flaps has an outwardly extending curved seal portion for providing a sealing action with said upper and lower curved sections of said rear wall, said curved seal portions blocking flow out of the peripheral chamber through the inlet openings outwardly around the forward edges of the flaps as the forward edges move across the inlet openings.

9. A combination as set forth in claim 7 wherein each of said outlet openings has a ring mounted therein for rotation, each ring having vanes for flow directing, said rings being movable to provide a variable forward thrust, said variable forward thrust being obtained while the engine is at a high R.P.M.

10. A combination as set forth in claim 9 wherein said peripheral housing has sides curved outwardly, four rings having fixed vanes for flow directing, a ring being mounted for rotation at the upper and lower corner of each side wall facing outwardly at an angle.

11. A combination as set forth in claim 1 wherein said peripheral housing extends entirely around said exhaust duct, said peripheral housing having a front wall connected to said exhaust duct, said peripheral housing having a rear wall connected to said exhaust duct, said peripheral chamber extending entirely around said exhaust duct, said inlet openings being located in the rear wall of said peripheral housing and opening into said peripheral chamber, said outlet openings directing exhaust flow out of said peripheral chamber.

12. In combination with an aircraft engine exhaust duct, a peripheral housing positioned around said exhaust duct forming a peripheral chamber therewith, said peripheral chamber extending entirely around said exhaust duct, said peripheral housing having a front wall extending outwardly from said exhaust duct forming the forward end of said peripheral chamber and a rear wall extending outwardly from said exhaust duct forming the rearward end of said peripheral chamber, nozzle means at the end of said aircraft engine exhaust duct being movable to variably control exhaust flow through said exhaust duct to provide a primary flow path for direct forward propulsion, inlet openings located through the rear wall of said peripheral housing opening into said peripheral chamber for receiving exhaust flow from said exhaust duct and directing it into said peripheral chamber, said inlet openings being positioned outwardly of said exhaust duct, said nozzle means being movable to direct exhaust flow from said exhaust duct forwardly into said peripheral chamber thorugh said inlet openings, outlet openings positioned in said peripheral housing to direct exhaust flow from said peripheral chamber to provide a secondary flow path.

* * * * *